US012515429B2

(12) United States Patent
Randall et al.

(10) Patent No.: US 12,515,429 B2
(45) Date of Patent: Jan. 6, 2026

(54) MANUFACTURE OF WIND TURBINE BLADES

(71) Applicant: Vestas Wind Systems A/S, Aarhus N (DK)

(72) Inventors: Stephen Randall, Isle Of Wight (GB); Jonathan Smith, Southampton (GB); Anton Bech, Ciudad Real (ES)

(73) Assignee: Vestas Wind Systems A/S, Aarhus N. (DK)

( * ) Notice: Subject to any disclaimer, the term of this patent is extended or adjusted under 35 U.S.C. 154(b) by 629 days.

(21) Appl. No.: 17/768,607

(22) PCT Filed: Oct. 21, 2020

(86) PCT No.: PCT/DK2020/050289
§ 371 (c)(1),
(2) Date: Apr. 13, 2022

(87) PCT Pub. No.: WO2021/078347
PCT Pub. Date: Apr. 29, 2021

(65) Prior Publication Data
US 2024/0293989 A1 Sep. 5, 2024

(30) Foreign Application Priority Data

Oct. 23, 2019 (DK) .......................... PA 2019 70662

(51) Int. Cl.
*B29D 99/00* (2010.01)
*B29K 105/04* (2006.01)
(Continued)

(52) U.S. Cl.
CPC ....... *B29D 99/0028* (2013.01); *F03D 1/0684* (2023.08); *B29K 2023/06* (2013.01);
(Continued)

(58) Field of Classification Search
CPC ............ B29K 2063/00; B29K 2067/00; B29K 2105/04; B29K 2307/04; B29K 2309/08;
(Continued)

(56) References Cited

U.S. PATENT DOCUMENTS

2009/0087318 A1* 4/2009 Althoff ................. F03D 1/0675
415/4.1
2009/0226702 A1 9/2009 Madsen et al.
(Continued)

FOREIGN PATENT DOCUMENTS

CN 101260861 A 9/2008
CN 107636303 A 1/2018
(Continued)

OTHER PUBLICATIONS

China National Intellectual Property Administration, office action issued in corresponding CN Application No. 202080086527.4, dated Jan. 18, 2024.
(Continued)

*Primary Examiner* — Cynthia L Schaller
(74) *Attorney, Agent, or Firm* — Wood Herron & Evans LLP

(57) ABSTRACT

In a first aspect of the invention there is provided a bondline structure for bonding a shear web to a wind turbine blade shell. The bondline structure comprises an elongate inner core made from a deformable material, and one or more outer layers comprising reinforcing fibres at least partially surrounding the inner core. The inner core and/or the one or more outer layers comprise an adhesive.

9 Claims, 7 Drawing Sheets

(51) Int. Cl.
    *F03D 1/06* (2006.01)
    *B29K 63/00* (2006.01)
    *B29K 67/00* (2006.01)
    *B29K 105/00* (2006.01)
    *B29K 307/04* (2006.01)
    *B29K 309/08* (2006.01)

(52) U.S. Cl.
    CPC ...... *B29K 2063/00* (2013.01); *B29K 2067/00* (2013.01); *B29K 2105/0097* (2013.01); *B29K 2105/04* (2013.01); *B29K 2307/04* (2013.01); *B29K 2309/08* (2013.01); *F05D 2230/23* (2013.01)

(58) Field of Classification Search
    CPC .............. B29K 2023/06; F05D 2230/23; C09J 2203/35; B29C 65/5021; B29C 65/5028; B29C 65/5057; B29C 66/112; B29C 66/1122; B29C 66/131; B29C 66/301; B29C 66/61; B29C 66/636; B29C 66/7212; B29L 2031/085; B29D 99/0028; F03D 1/0684
See application file for complete search history.

(56) References Cited

U.S. PATENT DOCUMENTS

| | | |
|---|---|---|
| 2012/0301316 A1 | 11/2012 | Velez Oria et al. |
| 2015/0198051 A1 | 7/2015 | Hayden et al. |
| 2015/0308402 A1* | 10/2015 | Nielsen ............... B29C 66/1122 |
| | | 156/349 |
| 2017/0067439 A1 | 3/2017 | Yarbrough et al. |
| 2017/0089323 A1* | 3/2017 | Yarbrough ............ F03D 1/0675 |

FOREIGN PATENT DOCUMENTS

| | | |
|---|---|---|
| CN | 109641408 A | 4/2019 |
| CN | 110267800 A | 9/2019 |
| DE | 102008037386 A1 | 4/2009 |
| DK | 200801307 A | 3/2009 |
| GB | 2535697 A | 8/2016 |
| WO | 2007048408 A1 | 5/2007 |
| WO | 2018184643 A1 | 10/2018 |

OTHER PUBLICATIONS

Danisih Patent and Trademark Office, Search and Examination Report in PA 2019 70662, Apr. 2, 2020.
European Patent Office, International Search Report and Written Opinion in PCT Application No. PCT/DK2020/050289, Jan. 21, 2021.

* cited by examiner

MANUFACTURE OF WIND TURBINE BLADES

TECHNICAL FIELD

The present invention relates generally to the manufacture of wind turbine blades, and more specifically to improvements in the bonding of shear webs to blade shells during the manufacture of wind turbine blades.

BACKGROUND

Modern utility-scale wind turbine blades typically comprise a substantially hollow shell supported at least in part by a reinforcing spar structure. In some known wind turbine blades the spar structure comprises a shear web and spar caps, the shear being bonded between the spar caps. The spar structure is designed to take up bending and shear loads experienced by the wind turbine blade during use. The quality of the joint between the shear web and the blade shell is therefore a significant factor affecting the durability of the blade.

Typically, the shear web is bonded to the blade shell at the same time as the bonding together of first and second half shells which form the hollow shell of the wind turbine blade. A bead of adhesive is typically deposited in one half shell and further adhesive is deposited along a top surface of the shear web. The shear web is then arranged in the first half shell before the second half shell is arranged on top of the first. The adhesive in the bondlines is then compressed and cured to bond the shells together and to bond the shear web between the half shells.

The present method of bonding shear webs to the blade shells introduces a number of challenges. For example, there is a risk of the shear web sinking too far into the uncured adhesive deposited on the first half shell. There is also a risk of the second half shell lifting up slightly as a result of thermal expansion of the blade shells during the adhesive curing process, when heat is applied to the mould assembly. Both scenarios may lead to the shear web becoming detached from the second half shell. Careful monitoring of the bonding process is therefore required to avoid these problems and thorough analysis of the bond lines is required to detect any problems should they arise.

Against this background it is an object of the present invention to provide an improved process for bonding shear webs to blade shells.

SUMMARY OF THE INVENTION

In a first aspect of the invention there is provided a bondline structure for bonding a shear web to a wind turbine blade shell. The bondline structure comprises an elongate inner core made from a deformable material, and one or more outer layers comprising reinforcing fibres at least partially surrounding the inner core. The inner core and/or the one or more outer layers comprise an adhesive.

The term "inner core" refers to the central component of the bondline structure, i.e. the inner core is the middle part of the bondline structure. The inner core may be made from compressible foam, preferably a cellular foam with closed cells. Alternatively, the inner core may be made from an adhesive.

Where the inner core comprises an adhesive, said adhesive is preferably an adhesive which expands upon application of heat thereto, such that the inner core of the bondline structure undergoes thermal expansion during heating thereof, for example in a curing process. Where the inner core comprises an adhesive, the one or more outer layers may comprise dry reinforcing fibres which become saturated by the adhesive of the inner core upon compression of the bondline structure.

The adhesive may comprise epoxy or polyester. However, any suitable adhesive may be used. The adhesive may be thixotropic, semi thixotropic, non-thixotropic or combinations thereof, to optimize the flow parameters of the adhesive. Where the one or more outer layers comprise an adhesive, the adhesive in the outer layers is preferably a resin.

The one or more outer layers preferably comprise a prepreg material. Where the one or more outer layers comprise a prepreg material, the reinforcing fibres of the outer layers are saturated with adhesive in the form of a resin matrix.

The one or more outer layers may comprise multiaxial fibres. Preferably the multiaxial fibres comprise biaxial fibres. Alternatively the multiaxial fibres may comprise triaxial or quadriaxial fibres. The fibres are preferably glass fibres. The fibres may alternatively be carbon fibres or any other suitable fibres. Preferably there is a plurality of outer layers.

In the case of a plurality of outer layers, an inside layer (or inside layers) nearest to the core may be formed from a different material to an outside layer (or outside layers) further from the core. The inside layers may be chopped strand mats or needle mats. The outside layers may be continuous strand mats. This allows better compliancy of the outside layers as the inside layers can adapt to the changing shape of the core. In addition the outside layer(s) may have out of plane filaments (i.e. extending transverse to a longitudinal axis of the bondline). This improves the fibre contact between the shear web and the blade shell.

Preferably a low percentage of the reinforcing fibres of the outer layers of the bondline structure are oriented parallel to a longitudinal axis of the bondline structure. Most preferably the outer layers of the bondline structure comprise substantially no fibres oriented parallel to the longitudinal axis of the bondline structure.

The inner core is preferably substantially cylindrical. Most preferably it is substantially circular in cross-section. Alternatively, it may have any other suitably shaped cross section. For example, the inner core may be elliptical, rectangular, hexagonal etc. in cross section. Whilst preferably there are no edges extending in a longitudinal direction of the inner core, if there are any edges, they are preferably rounded.

Preferably, the one or more outer layers are wrapped around a full circumference of the inner core. In other words, the entire circumference of the inner core is covered by the one or more outer layers. This provides for efficient transfer of loads between the shear web and the blade shell.

Preferably the inner core does not contain any reinforcing fibres. In other words, in the bondline structure, all of the reinforcing fibres are located in the one or more outer layers. In this way, loads between the shear web and the blade shell are transferred efficiently in the one or more outer layers.

The blade shell preferably comprises spar caps. The spar caps may be mutually opposed, located on opposite sides of the blade shell. The spar caps may be embedded within a laminate structure of the blade shell. Alternatively the blade shell may comprise mutually opposed spar caps bonded to an inner surface of an aerodynamic fairing.

In a second aspect of the invention there is provided a method of making a wind turbine blade. The method comprises providing first and second half shells to be bonded together to form an outer shell of the blade, and providing a shear web having a first mounting flange for bonding to an inner surface of the first half shell and a second mounting flange for bonding to an inner surface of the second half shell. The method further comprises providing a bondline structure as described above, and arranging the bondline structure between the first mounting flange and the inner surface of the first half shell. The method further comprises pressing the shear web and the first half shell together such that the bondline structure becomes compressed between the first mounting flange and the inner surface of the first half shell, and curing the adhesive in the bondline structure such that the bondline structure bonds the first mounting flange to the first half shell.

The method may comprise arranging the bondline structure in a bondline region of the first half shell. Preferably the bondline region is defined by the spar caps of the blade shell such that a reinforcing spar structure may be formed by the spar caps and shear web when the shear web is bonded to the blade shell.

The method may additionally comprise arranging a further bondline structure as described above between the second mounting flange and the inner surface of the second half shell. The further bondline structure could be arranged on an upper surface of the shear web, or on the surface of the second half shell. The shear web and the second half shell may be pressed together such that the further bondline structure becomes compressed between the second mounting flange and the inner surface of the second half shell. The method may further comprise curing the adhesive in the further bondline structure such that the further bondline structure bonds the second mounting flange to the second half shell.

Where the inner core is made from an adhesive, the step of curing the adhesive may comprise applying heat to the bondline structure, and said application of heat may cause the adhesive of the inner core to expand.

The step of providing the one or more bondline structures may comprise winding fibrous material around an elongate inner core.

The method may further comprise providing a winding machine configured to wind fibrous material around inner core material to form a bondline structure. The winding machine may be arranged at one end of the first half shell. One or more lengths of inner core material may be inserted through the winding machine such that the outer fibrous material may be wound around the inner core material to form a continuous bondline structure. The continuous bondline structure may be pulled out of the winding machine and onto the inner surface of the first half shell.

The winding machine is preferably arranged at the root of the blade shell and the adhesive structure is pulled in a spanwise direction towards the tip end of the blade shell.

Optional and advantageous features described above in relation to any one aspect of the invention are equally applicable to the other aspects of the invention. Repetition of such features is avoided purely for reasons of conciseness.

BRIEF DESCRIPTION OF THE DRAWINGS

Embodiments of the present invention will now be described by way of non-limiting example only, with reference to the accompanying figures, in which.

DETAILED DESCRIPTION

Figure 1:
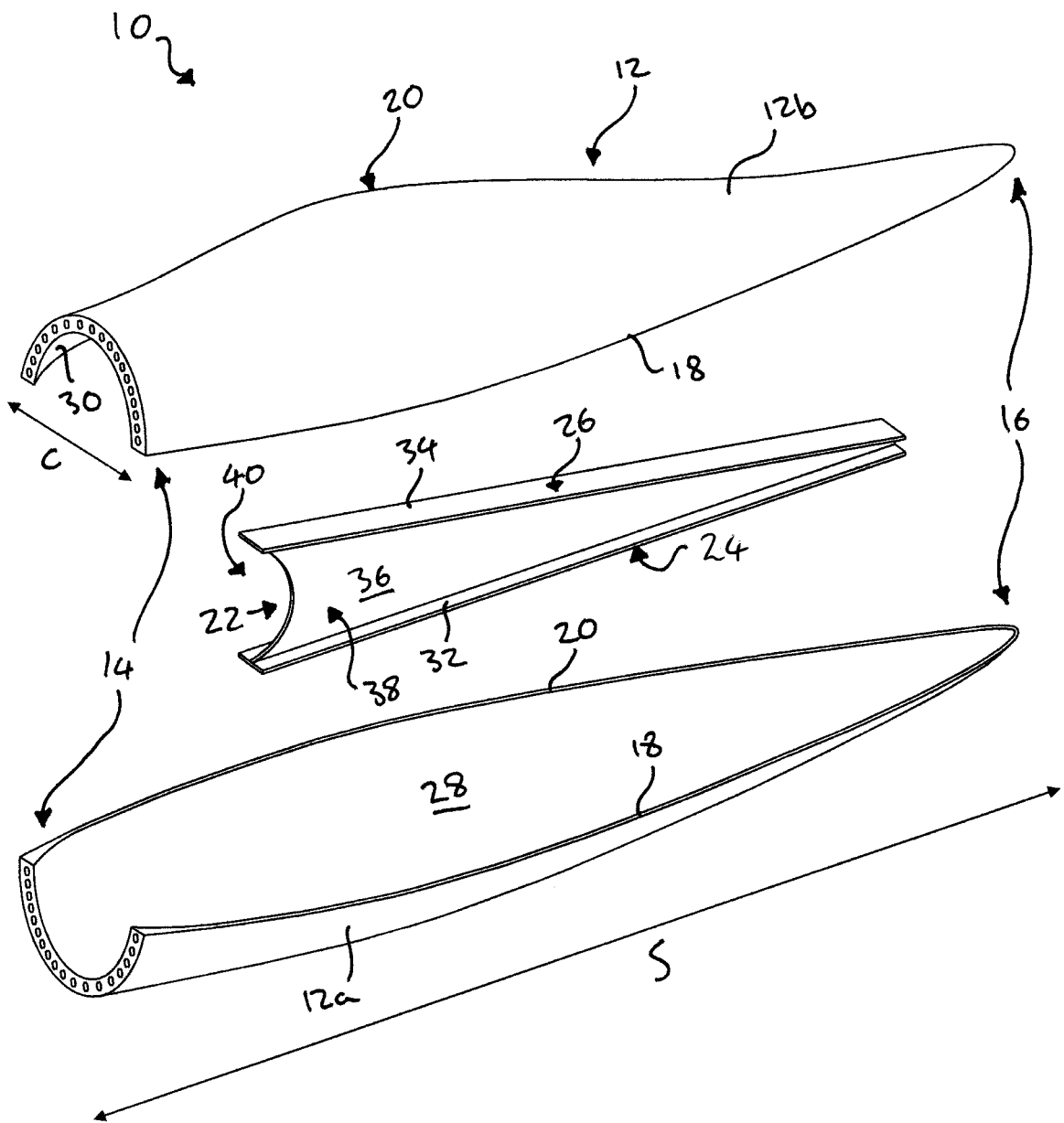
FIG. 1 is a schematic exploded view of a wind turbine blade.

FIG. 1 is a schematic exploded view of a wind turbine blade 10. The blade 10 comprises an outer shell 12 of a composite construction and formed of a first (leeward) half shell 12a and a second (windward) half shell 12b. The blade 10 extends in a spanwise direction (S) from a root end 14 to a tip end 16 of the blade, and in a chordwise direction (C) between a leading edge 18 and a trailing edge 20. A shear web 22 forming part of a reinforcing spar structure is located inside the blade 10. The shear web 22 is bonded along lower and upper surfaces 24, 26 to respective inner surfaces 28, 30 of the blade shells 12a, 12b, as described in further detail later.

In this example, the shear web 22 comprises first and second mounting flanges 32, 34 arranged along longitudinal edges of an elongate panel 36. The flanges 32, 34 extend transversely from the panel 36. In this example, the shear web 22 comprises a substantially I-shaped cross section wherein the mounting flanges 32, 34 extend transverse to the shear web panel 36 on both a first and an opposing second side 38, 40 of the shear web 22. In other examples the flanges 32, 34 may each extend transverse to the panel 36 on the same side thereof, the shear web 22 thereby comprising a substantially C-shaped cross section. The present invention is not limited to any particular shape of shear web 22.

The reinforcing spar structure further comprises spar caps (not shown) which, together with the shear web 22, provide structural and torsional rigidity to the wind turbine blade 10. The spar caps are formed of a reinforcing fibrous material such as carbon fibre reinforced plastic (CFRP), and extend longitudinally in the spanwise direction (S) to absorb bending loads along the blade 10. In preferred examples the spar caps are embedded in the laminate structures of the half shells 12a, 12b. In other examples, the blade shell 12 may comprise mutually opposed spar caps bonded to an inner surface of an aerodynamic fairing. It will be appreciated that the present invention is equally applicable to wind turbine blades 10 comprising any type of blade shell 12.

Figure 2A:
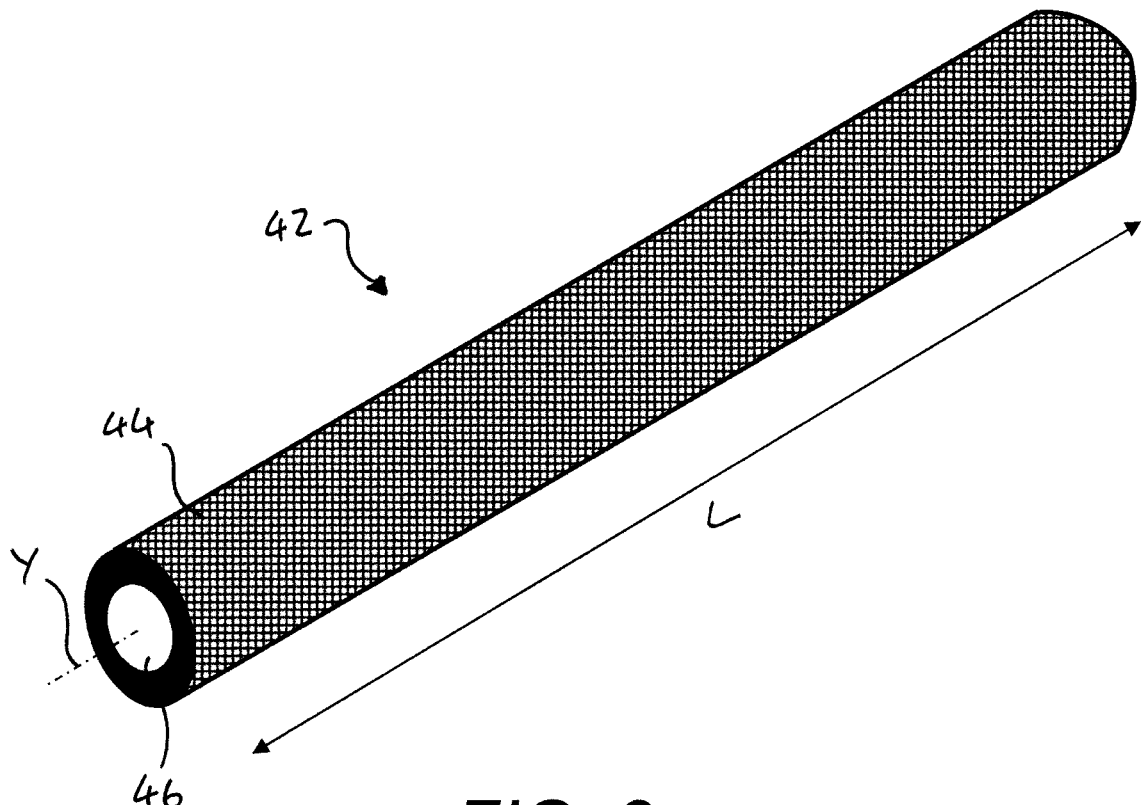
FIG. 2a is a schematic perspective view of a bondline structure.

FIG. 2a is a schematic perspective view of a bondline structure 42 for bonding the shear web 22 to the blade shells 12a, 12b. The bondline structure 42 comprises one or more outer layers 44 comprising reinforcing fibres surrounding an inner core 46. The inner core 46 is made from a deformable material. In a particular example, the outer layers 44 may comprise reinforcing fibrous fabric that is pre-impregnated with uncured resin (so-called 'prepreg' material), and the deformable inner core 46 may be made from compressible foam. The bondline structure 42 may be configured differently and/or may be made from other materials in other examples. Various possibilities will be described later.

Figure 2B:
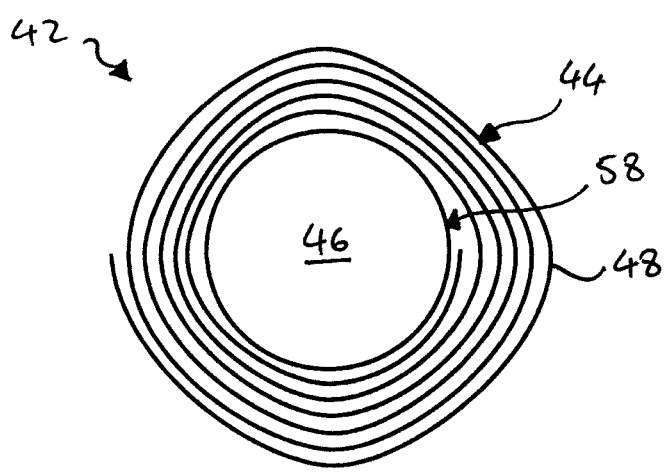
FIG. 2b is a schematic cross-sectional view of the bondline structure.

FIG. 2b is a schematic cross sectional view of the bondline structure 42. The outer layers 44 may comprise a single layer 48 of reinforcing fibres wrapped around the inner core 46 a plurality of times such that the bondline structure 42 comprises a plurality of outer layers 44. As shown, the outer layers 44 may form a continuous spiral in cross section. In other examples, one or more separate sheets of fibrous material may be wrapped around the core 46. In such an example the outer layers 44 may form a discontinuous spiral in cross section.

The process of bonding a shear web 22 between first and second half shells 12a, 12b using the bondline structure 42 will now be described with reference to the remaining figures.

Figure 3:
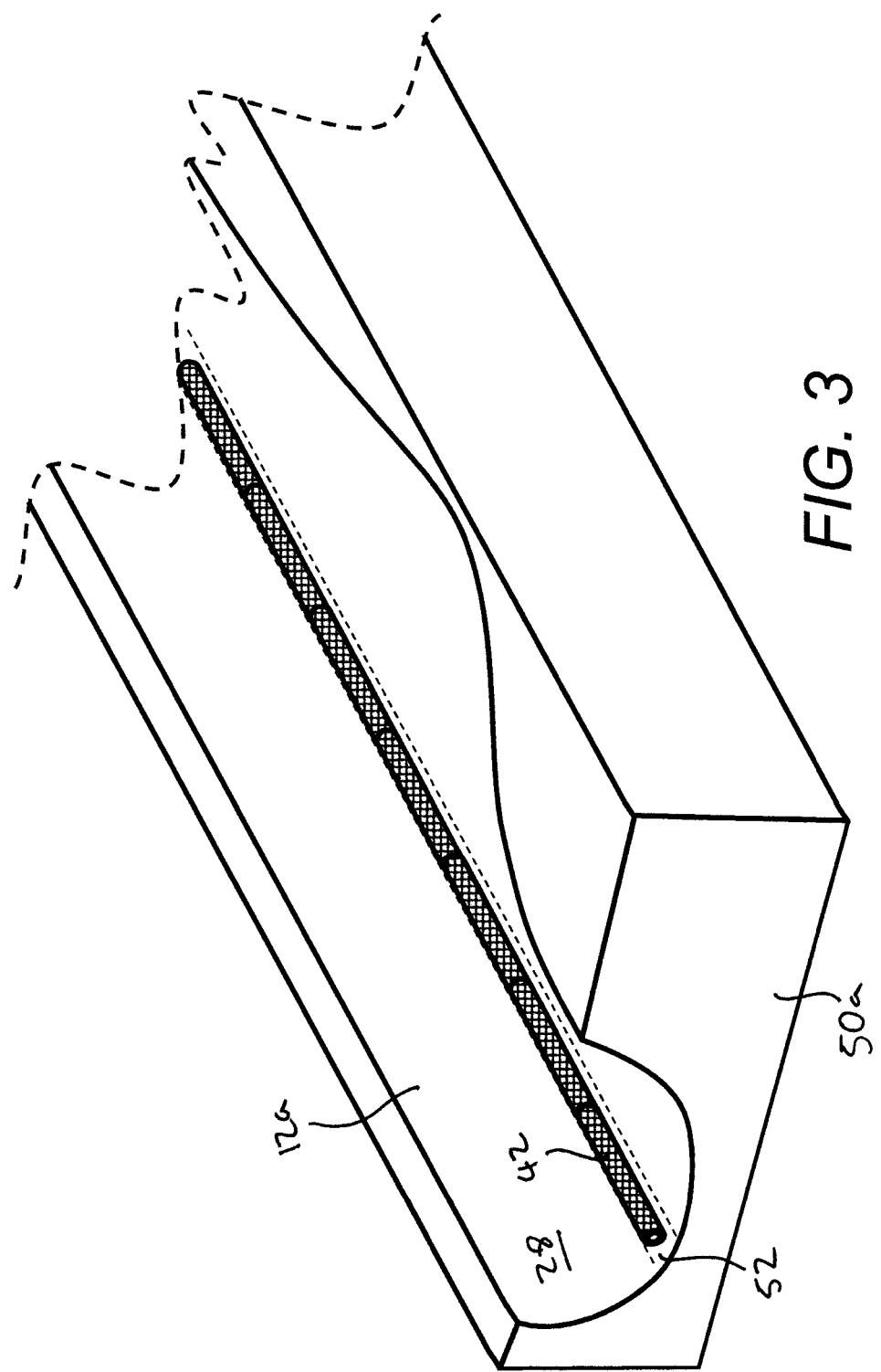
FIG. 3 is a schematic perspective view of part of a first blade shell supported in a first half mould during a stage in the manufacture of the wind turbine blade.

Referring to FIG. 3, this shows a first half shell 12a supported in a corresponding first half mould 50a. A first bondline structure 42 as described above is arranged on an inner surface 28 of the first half shell 12a. In this example the first bondline structure 42 is formed of a plurality of discrete lengths which are arranged end to end in the first half shell 12a. The first bondline structure 42 is arranged on top of a spar cap 52, which is embedded in the laminate structure of the blade shell 12a.

Figure 4:
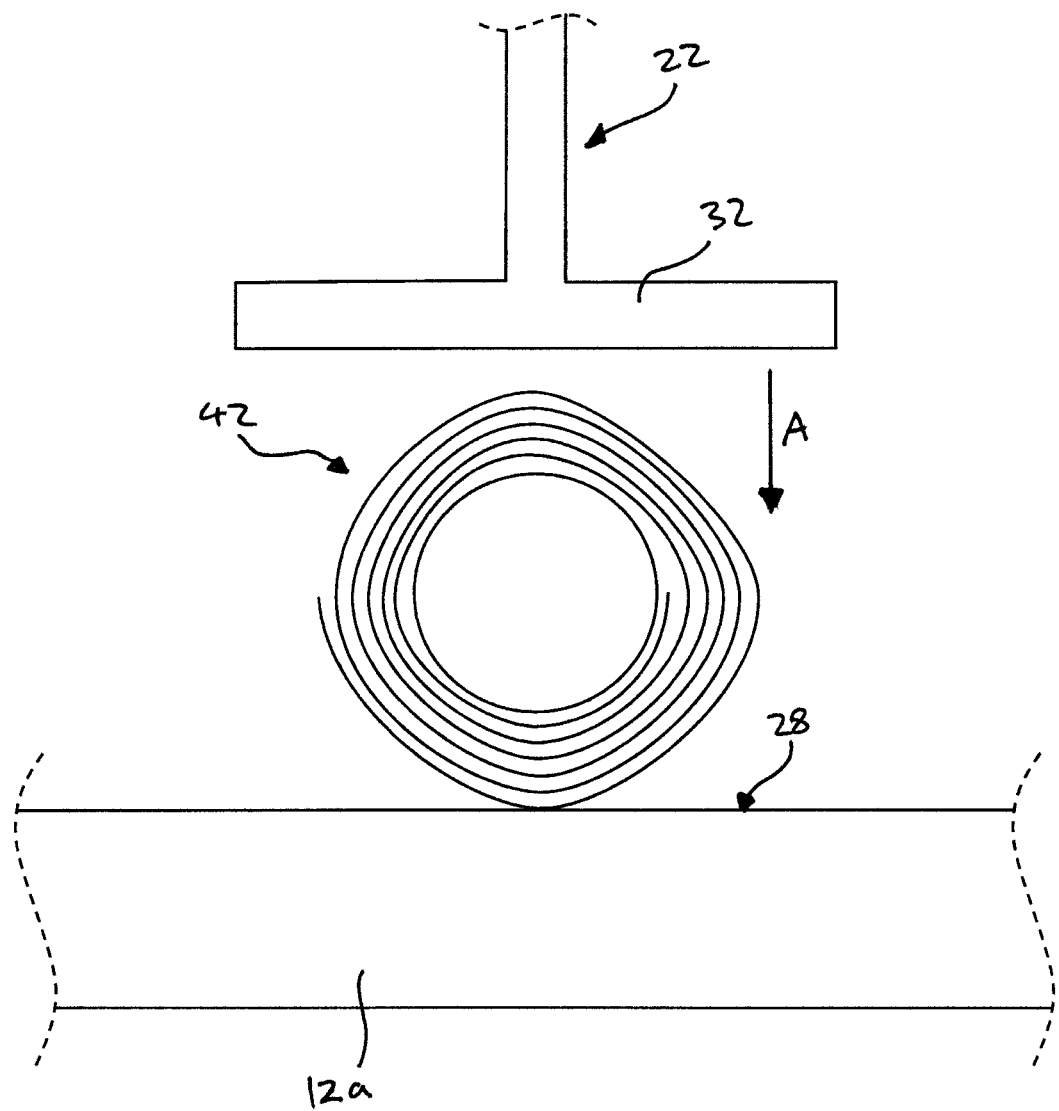
FIG. 4 is a schematic cross-sectional view of a portion of the first half shell, a bondline structure, and a shear web aligned with the bondline structure.

FIG. 4 is a schematic cross-sectional view showing a shear web 22 supported above the first bondline structure 42 on the first half shell 12a. For the purpose of illustration, only the first mounting flange 32 of the shear web 22 is shown. The shear web 22 is aligned with the first bondline structure 42 such that the first bondline structure is located between the first mounting flange 32 of the shear web 22 and the inner surface 28 of the first half shell 12a. The shear web 22 is then lowered onto the first bondline structure 42 in the direction of the arrow A.

Figure 5:
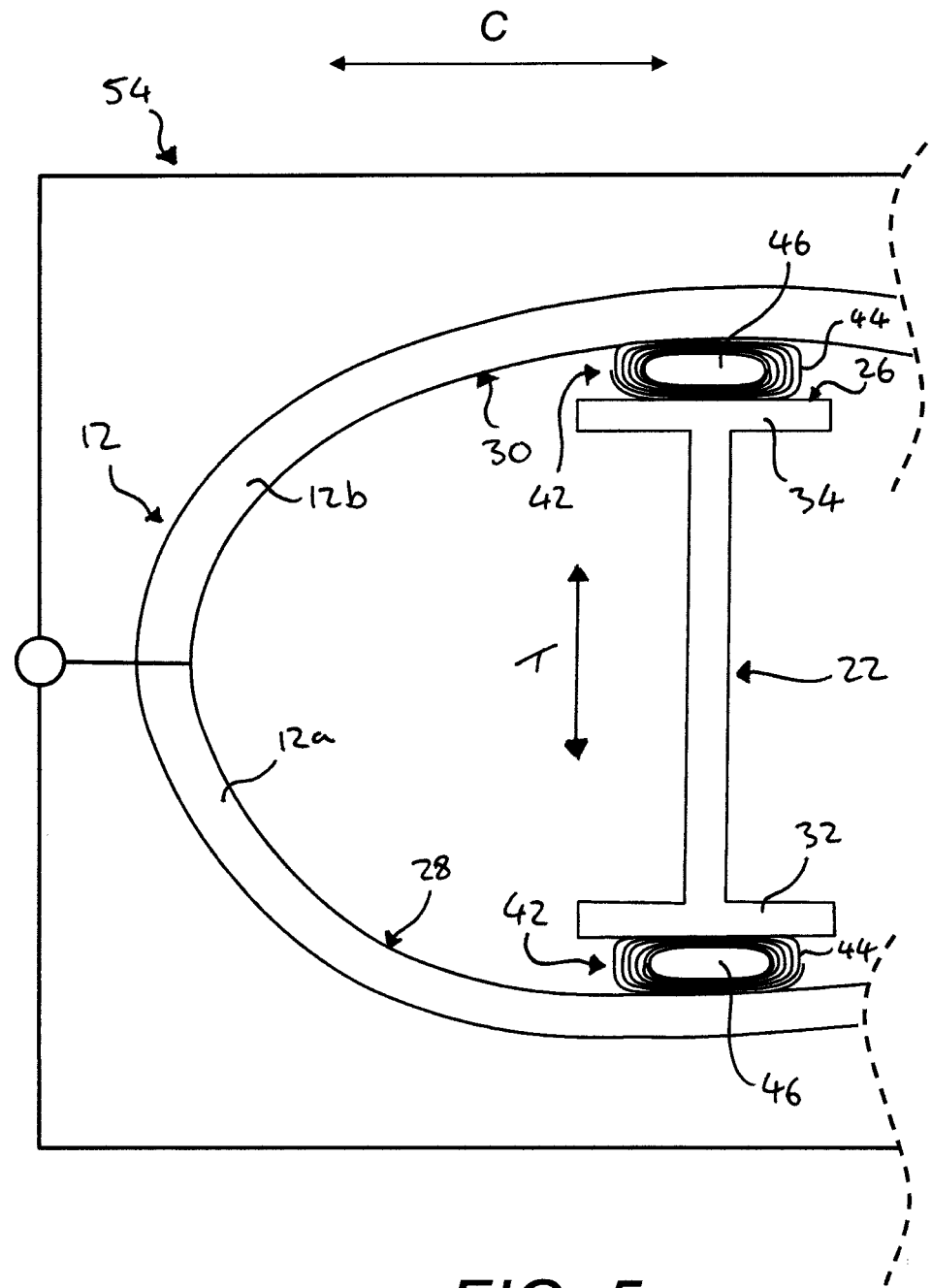
FIG. 5 is a schematic cross-sectional view of a closed blade mould assembly showing bondline structures being compressed between the shear web and first and second half shells during the manufacture of the wind turbine blade.

Referring now to FIG. 5, this is a schematic cross-sectional view of part of a wind turbine blade mould assembly 54 in a closed configuration. In this configuration, a second half shell 12b is positioned on top of the first half shell 12a. Prior to closing the mould assembly 54, a second bondline structure 42 may be arranged on the upper surface 26 of the shear web 22 between the second mounting flange 34 of the shear web 22 and the inner surface 30 of the second half shell 12b. Alternatively, the second bondline structure 42 may be affixed to the inner surface 30 of the second half shell 12b prior to closing the mould.

The first and second bondline structures 42 in this example comprise an inner core 46 made of compressible foam surrounded by outer layers 44 of reinforcing fibres. In this example the outer layers 44 comprise a prepreg material wherein the reinforcing fibres of the outer layers 44 are saturated with a resin. In this example the adhesive in the outer layers 44 is therefore a resin such as epoxy or polyester resin.

When the mould assembly 54 is closed, the first bondline structure 42 is compressed between the first mounting flange 32 and the first half shell 12a, and the second bondline structure 42 is compressed between the second mounting flange 34 and the second half shell 12b. When compressed, the deformable material of the inner core 46 in each bondline structure 42 serves to resiliently bias against the movement of the shear web mounting flanges 32 and 34 towards the respective inner surfaces 28, 30 of the half shells 12a, 12b. For example in relation to the first mounting flange 32 and the inner surface 28 of the first half shell 12a, the elasticity of the inner core 46 serves to push upwards against the first mounting flange 32. The shear web 22 therefore cannot sink to a point such that it would come into contact with the first half shell 12a. Also, in the event of thermal expansion causing the second half shell 12b to lift up and away from the shear web 22, the compressed bondline structures 42 will expand slightly, pushing the shear web 22 upwards, and ensuring that the shear web 22 remains attached to the second half shell 12b via the second bondline structure 42.

The expansion and compression of the bondline structures 42 is directly related to the movement of the half shells 12a, 12b and shear web 22 relative to one another. As such, the elasticity of the deformable inner core 46 serves to ensure that the bondline structure 42 follows any movement of the blade shell 12 to maintain a connection between the shear web 22 and blade shell 12 throughout curing of the adhesive in the outer layers 44 of reinforcing fibres.

The adhesive in the outer layers of the bondline structures 42 (i.e. the resin matrix of the prepreg outer layers) is cured to respectively bond the first and second mounting flanges 32, 34 of the shear web 22 to the inner surfaces 28, 30 of the first and second half shells 12a, 12b. The fibrous material in the outer layers 44 of the bondline structures 42 results in a strong fibre connection being made between the blade shell 12 and the shear web 22. The reinforcing fibres of the bondline structures 42 enable more effective transfer of loads between the blade shell 12 and shear web 22 than was previously achievable using pure adhesive to bond a shear web 22 in place.

Figure 6:
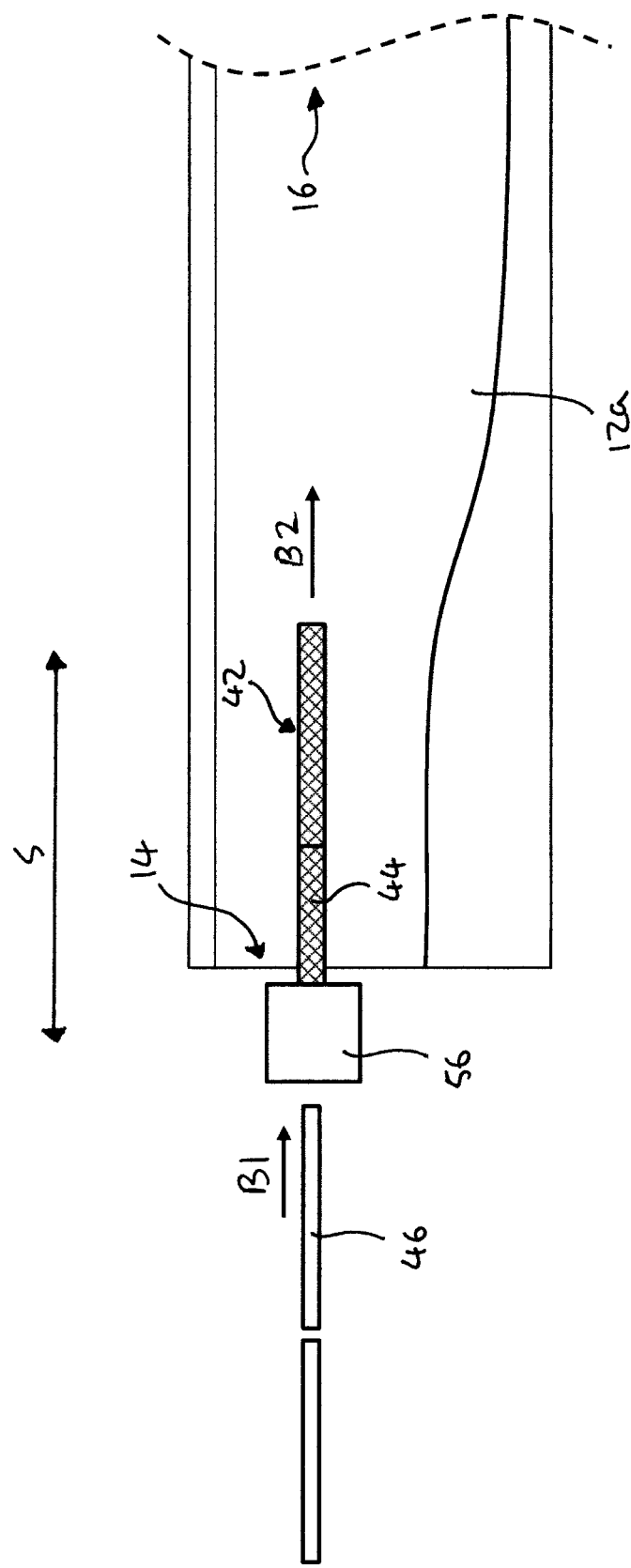
FIG. 6 is a schematic plan view of an optional stage during the manufacture of a wind turbine blade wherein a bondline structure is formed using a winding machine.

FIG. 6 shows an optional stage in the blade manufacturing process, which involves forming the bondline structure 42 at the same time as arranging the bondline structure 42 in the first half shell 12a. Specifically, a winding machine 56 is arranged at the root end 14 of the first half shell 12a. The winding machine 56 is configured to wind reinforcing fibrous material around elongate core material 46 to form the bondline structure 42. Elongate core material 46 is fed through the winding machine 56 in a spanwise direction (S) towards the tip end 16 of the half shell 12a, as indicated by the arrow B1. The winding machine 56 wraps the fibrous outer layers 44 around the core 46. The completed bondline structure 42 is pulled out of the winding machine 56 and pulled directly into the first half shell 12a in the direction of arrow B2. The winding machine 56 may similarly be used to form the second bondline structure 42.

In other examples the winding machine 56 could be arranged at the tip end 16 of the first half shell 12a, in which case the bondline structure 42 may be pulled out of the winding machine 56 in a spanwise direction (S) towards the blade root 14.

A continuous length of core material 46 may be fed through the winding machine 56. Alternatively, a plurality of discrete lengths of core material 46 may be fed through the winding machine 56. In both cases the winding of fibrous outer layers 44 around the core material 46 may be continuous. Therefore, the winding process enables a continuous bondline structure 42 to be formed from a plurality of discrete lengths of core material 46. As a further alternative, the winding machine 56 can be used to produce a plurality of discrete bondline structures 42 that are then arranged end to end.

Use of a winding machine 56 is advantageous because it enables the bondline structures 42 to be produced in a semi-automated process with high repeatability. The bondline structures 42 produced have a high degree of uniformity. It is also particularly advantageous to produce the bondline structures 42 immediately before they are used, because this avoids the need to transport or store the bondline structures 42.

Whilst a winding machine 56 has been described with reference to FIG. 6 as a possible means for manufacturing a bondline structure 42, in other examples the bondline structure 42 may be formed in a number of different processes. For example, the bondline structure 42 may be formed in a pultrusion process wherein the elongate core material 46 and outer layers 44 of reinforcing fibres are pulled through a die. In such a process, the outer layers 44 of reinforcing fibres may be coated in an adhesive (e.g. resin) prior to being pulled through the die. Alternatively the outer layers 44 of the bondline structure 42 may be coated in adhesive after having been pulled through the die with the inner core material 46.

Figure 7:
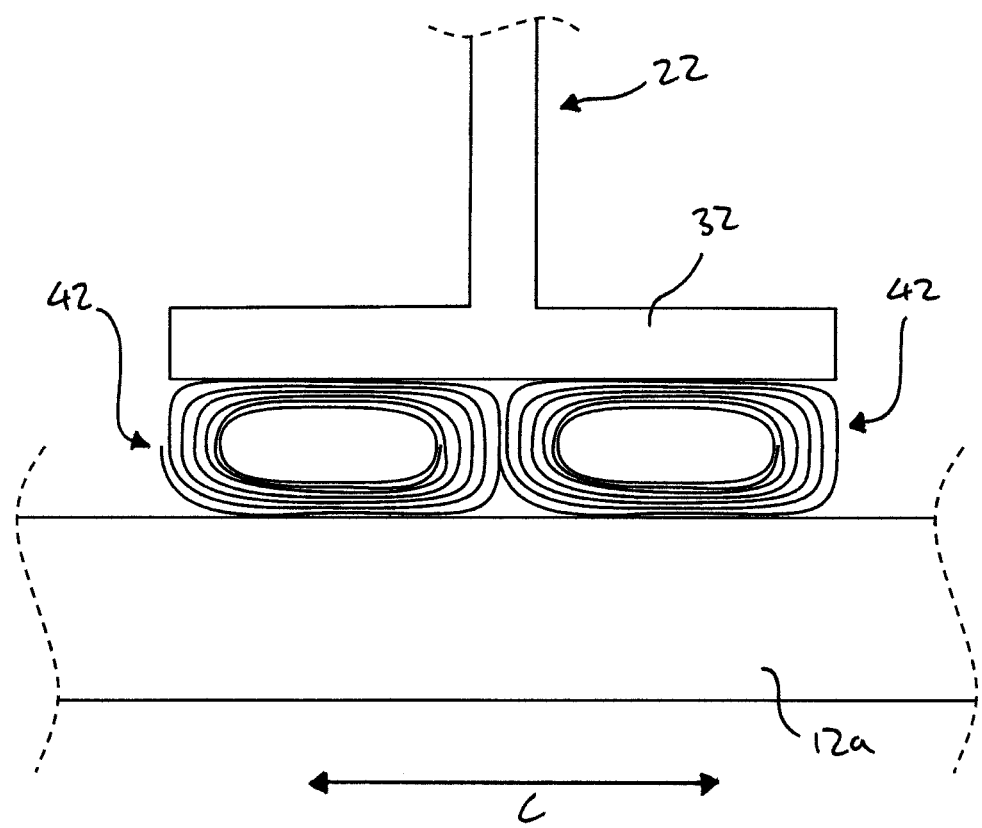
FIG. 7 is a schematic cross-sectional view of a shear web bonded to a wind turbine blade shell by two bondline structures.

Further, with reference to FIG. 7, it is also anticipated that in some examples the bondline structures 42 may be arranged in multiple rows. As shown in FIG. 7, two bondline structures 42 are arranged side by side in the chordwise direction (C) between the first mounting flange 32 and the first half shell 12a. A similar arrangement of bondline structures 42 may be provided between the second mounting flange 34 (not shown) and the second half shell 12b (not shown). More than two rows of bondline structures 42 may be used in yet further examples.

In the above examples, the outer layers 44 of the bondline structures 42 comprise a prepreg material, wherein the reinforcing fibres are pre-impregnated with an adhesive. Any suitable adhesive may be used, including resins such as epoxy resin or polyester resin. Using pre-impregnated fibrous material can aid in achieving a complete and consistent distribution of adhesive when bonding the shear web 22 to the blade shell 12.

In other examples the outer layers 44 may comprise dry fibrous material which later becomes saturated with adhesive when bonding the shear web 22 to the blade shell 12. In this case, for example, adhesive may be separately applied to the dry outer layers 44, for example using a brush or roller. As a further alternative, adhesive may be included in the core 46. However, in each of the examples discussed herein, at least one of the inner core 46 and/or the outer layers 44 comprises an adhesive in order to bond the shear web 22 to the blade shell 12.

In some examples, a bondline structure may comprise an inner core formed of adhesive which is surrounded by outer layers 44 which comprise dry reinforcing fibres. The dry reinforcing fibre of the outer layers may then become saturated by the adhesive of the inner core during compression of the bondline structures in manufacturing a wind turbine blade as described with reference to FIG. 5.

In yet further examples, a bondline structure 42 may comprise an inner core 46 made from an adhesive which is surrounded by outer layers 44 comprising a prepreg material as described above.

Any suitable reinforcing fibres may be used in the outer layers 44 of the bondline structures 42. However, glass or carbon fibres are preferred. In preferred examples, the outer layers 44 comprise multiaxial reinforcing fibres in order to most effectively transfer loads between the shear web 22 and the blade shell 12. The outer layers 44 may therefore comprise biaxial, triaxial or even quadriaxial fibrous material in which the fibres are each respectively oriented at two, three or four different angles relative to a longitudinal axis Y of the bondline structure 42 (indicated in FIG. 2a).

Preferably, the bondline structures 42 comprises no reinforcing fibres oriented parallel to the longitudinal axis Y of the bondline structure 42, or only a low percentage of fibres oriented parallel to the longitudinal axis Y, such as less than 25%, more preferably less than 10%. The durability of the joint between the shear web 22 and the blade shell 12 is increased in such examples because the lack of longitudinally-oriented fibres means substantially no shear loads are absorbed in the bondline structure 42. The shear loads are instead substantially wholly absorbed by the shear web 22 which is specifically designed to withstand such loading, and the bondline structures 42 merely serve to transfer loads between the blade shell 12 and shear web 22.

Preferably the elastic modulus of the first bondline structure 42 is substantially the same as the elastic modulus of the second bondline structure 42. This may be achieved by forming the inner core 46 of the first and second bondline structures 42 from the same material. This results in the shear web 22 being suspended at a substantially equal distance from each of the first and second half shells 12a, 12b, on account of each of the bondline structures 42 being compressed substantially equally. The shear web 22 is therefore supported substantially centrally between the two half shells 12a, 12b.

Preferably, where the inner core 46 of a bondline structure 42 is formed of a compressible foam material, the inner core 46 comprises a material having a relatively high Poisson's ratio. This means that compression of the bondline structure 42 and inner core 46 in a transverse direction T (indicated in FIG. 5) results in an expansion of the inner core 46 in the chordwise direction (C). The chordwise expansion of the inner core 46 when the bondline structure 42 is compressed ensures that the outer layers 44 of reinforcing fibres surrounding the inner core 46 are stretched and do not wrinkle. This further ensures that the formation of stress concentrations in the outer layers 44 of the bondline structure 42 in a finished blade 10 is minimised. Loads can therefore be transferred effectively along the reinforcing fibres of the outer layers 44.

The inner core 46 is preferably made from foam. The foam may be an open cell foam or a closed cell foam. Preferably, the foam is a closed cell foam. A closed cell foam inner core 46 does not significantly absorb adhesive during the bonding together of the shear web 22 and the blade shell 12. Using a closed cell foam is therefore advantageous as the amount of adhesive used to bond the shear web 22 to the blade shell 12 can be closely controlled to ensure a consistent distribution of said adhesive along the bondline structure 42. Further, because a closed cell foam does not significantly absorb adhesive, the weight of the blade 10 can be reduced as the inner core 46 is largely comprised of sealed pockets of air. In particularly preferred examples, the inner core 46 is made from polyethylene foam. In other examples the inner core 46 may be made from an adhesive as described above. For example, the inner core 46 may be made from Sikareinforcer®.

In examples wherein a bondline structure 42 comprises an inner core 46 made from an adhesive, the adhesive is preferably an adhesive which expands upon application of heat thereto. For example, during the curing of adhesive in the outer layers 44 of a bondline structure 42 to bond the shear web 22 to the blade shell 12, heat may be applied to the bondline structures 42. Such application of heat in the present example causes the adhesive inner core 46 to undergo thermal expansion. It will be understood that the benefits of such a thermally expanding inner core 46 are the same as those described throughout with reference to an elastically deformable inner core 46. Primarily, the thermally expanding inner core 46 serves to fill any gaps between the mounting flanges 32, 34 of the shear web 22 and the inner surfaces 28, 30 of the blade shell 12 to ensure a consistent and thorough bond between the shear web 22 and the blade shell 12.

The inner core 46 may be any of a number of suitable shapes in cross section. For example the inner core 46 may be elliptical, hexagonal or octagonal in cross section. In preferred examples, any edges of the inner core 46 extending in the longitudinal direction are rounded. In the most preferred examples, for example as shown in FIGS. 2a and 2b, the inner core 46 comprises a substantially circular cross section, the inner core 46 thereby having no longitudinally-extending edges.

An inner core 46 having a substantially circular cross section is particularly advantageous in minimising the occurrence of wrinkles in the outer layers 44 of reinforcing fibres when the bondline structure 42 is compressed during bonding of the shear web 22 to the blade shell 12. The lack of longitudinally extending edges means that an outer surface 58 of the inner core 46 (indicated on FIG. 2b) remains smooth even when the bondline structure 42 is compressed. The outer layers 44 of reinforcing fibres surrounding the inner core 46 are therefore also substantially smooth as they conform to the profile of the inner core 46 under compression of the bondline structure 42. This serves to reduce any potential stress concentrations in the outer layers 44 of reinforcing fibres in a finished blade 10 as the fibres remain substantially straight and do not become kinked or bent around edges of the inner core 46 when the bondline structure 42 is compressed.

To minimise the risk of the outer layers 44 wrinkling during compression of the bondline structure 42, the inner core 46 preferably comprises both a material having a high Poisson's ratio and a substantially circular cross section.

The bondline structures 42 may have any suitable length L. In some examples the bondline structures 42 may have a length L substantially the same as that of the shear web 22 to be bonded to the blade shell 12. Equally however, the bondline structure 42 may be formed of a plurality of discrete lengths to facilitate transport of said structure 42 and/or to ease handling during manufacture of the wind turbine blade 10.

Manufacturing a wind turbine blade 10 in accordance with the methods described above, and using a bondline structure 42 as described above to bond the shear web 22 to the blade shell 12, provides a number of advantages over previous techniques for bonding a shear web 22 in a wind turbine blade 10. Primarily, a bondline structure 42 as described herein provides a more consistent and durable bond between a blade shell 12 and a shear web 22, which is less susceptible to defects than previous methods of pure adhesive bonding. The reinforcing fibres of the bondline structure 42 provide a stronger connection between the blade shell 12 and shear web 22 which is capable of effectively transferring loads between the shell 12 and shear web 22 in a more robust manner.

The inner core 46 ensures that any movement of the shells 12a, 12b is mirrored by the bondline structures 42 to ensure the shear web 22 remains connected to the blade shells 12a, 12b during the blade join-up process and during the curing of the adhesive. The bondline structures 42 are able to accommodate thermal expansion of the blade shells 12a, 12b during adhesive curing, and ensure that the shear web 22 remains attached to the blade shells 12a, 12b despite some movement of the blade shells.

The bondline structures 42 prevent the possibility of the shear webs 22 coming into direct contact with the blade shells 12a, 12b and ensure there is always adhesive between the shear web mounting flanges 32, 34 and the blade shells 12a, 12b along the entire length of the shear web 22. The problem of a shear web 22 sinking too far into adhesive is therefore avoided.

Tooling and manufacturing costs involved in manufacturing a wind turbine blade 10 can be greatly reduced by using a bondline structure 42 to bond the shear web 22 to the shell 12 instead of pure adhesive. The deformable and compressible bondline structures 42 accommodate variations in the geometry of the shear web 22 and blade shell 12. Both the shell 12 and shear web 22 may therefore be manufactured with a greater dimensional tolerance. Similarly, various wind turbine blade designs having different shell thicknesses or shear web geometry may be formed in a single mould assembly on account of the bondline structures 42 accommodating such dimensional variations.

Whilst in the above examples bondline structures 42 are provided on both sides of the shear web 22, in other examples a bondline structure 42 may be provided only on one side of the shear web 22. In such cases, a simple adhesive bondline may be formed on the other side of the shear web 22.

The above description is provided to illustrate preferred examples of bondline structures and a method for making a wind turbine blade, though it will be appreciated that many alternatives to the above examples are possible without departing from the scope of the invention as defined in the appended claims.

The invention claimed is:

1. A bondline structure for bonding a shear web to a wind turbine blade shell, the bondline structure comprising:
   an elongate inner core made from a deformable material;
   one or more outer layers comprising reinforcing fibres at least partially surrounding the inner core,
   wherein the inner core is made from an adhesive,
   wherein the one or more outer layers are wrapped around a full circumference of the inner core, and
   wherein the one or more outer layers optionally comprises an adhesive.

2. The bondline structure of claim 1, wherein the one or more outer layers comprise a prepreg material.

3. The bondline structure of claim 1, wherein the one or more outer layers comprise multiaxial fibres.

4. The bondline structure of claim 1, wherein the inner core does not contain any reinforcing fibres.

5. A method of making a wind turbine blade, the method comprising;
   providing first and second half shells to be bonded together to form an outer shell of the blade;
   providing a shear web having a first mounting flange for bonding to an inner surface of the first half shell and a second mounting flange for bonding to an inner surface of the second half shell;
   providing a bondline structure as claimed in claim 1,
   arranging the bondline structure between the first mounting flange and the inner surface of the first half shell;
   pressing the shear web and the first half shell together such that the bondline structure becomes compressed between the first mounting flange and the inner surface of the first half shell; and
   curing the adhesive in the bondline structure such that the bondline structure bonds the first mounting flange to the first half shell.

6. The method of claim 5, further comprising:
arranging a further bondline structure between the second mounting flange and the inner surface of the second half shell;
pressing the shear web and the second half shell together such that the further bondline structure becomes compressed between the second mounting flange and the inner surface of the second half shell; and
curing the adhesive in the further bondline structure such that the further bondline structure bonds the second mounting flange to the second half shell.

7. The method of claim 5, wherein the step of curing the adhesive comprises applying heat to the bondline structure, and said application of heat causes the adhesive of the inner core to expand.

8. The method of claim 5, wherein the step of providing the one or more bondline structures comprises winding reinforcing fibrous material around an elongate inner core.

9. The method of claim 5, further comprising:
providing a winding machine configured to wind reinforcing fibrous material around inner core material to form a bondline structure;
arranging the winding machine at one end of the first half shell;
inserting one or more lengths of inner core material through the winding machine such that the reinforcing fibrous material is wound around the inner core material to form a continuous bondline structure;
pulling the continuous bondline structure out of the winding machine and onto the inner surface of the first half shell.

* * * * *